United States Patent
Wohlert et al.

(10) Patent No.: US 9,344,561 B2
(45) Date of Patent: May 17, 2016

(54) DEVICES, SYSTEMS, AND METHODS FOR PRESENCE DETERMINATION

(71) Applicant: AT&T Intellectual Property I, L.P., Atlanta, GA (US)

(72) Inventors: Randolph Robert Wohlert, Austin, TX (US); Inderpreet Singh Ahluwalia, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 14/809,731

(22) Filed: Jul. 27, 2015

(65) Prior Publication Data

US 2015/0334229 A1 Nov. 19, 2015

Related U.S. Application Data

(63) Continuation of application No. 13/034,554, filed on Feb. 24, 2011, now Pat. No. 9,094,786.

(51) Int. Cl.
| | |
|---|---|
| *G08B 1/08* | (2006.01) |
| *G08B 23/00* | (2006.01) |
| *H04W 24/00* | (2009.01) |
| *H04W 4/00* | (2009.01) |
| *H04M 3/42* | (2006.01) |
| *H04W 4/16* | (2009.01) |
| *H04W 4/02* | (2009.01) |

(Continued)

(52) U.S. Cl.
CPC ........... *H04M 3/42365* (2013.01); *H04L 67/24* (2013.01); *H04W 4/02* (2013.01); *H04W 4/16* (2013.01); *G06N 5/025* (2013.01)

(58) Field of Classification Search
CPC ..... H04L 67/24; H04L 63/0263; H04W 4/02; H04W 64/00; G06N 5/025; G06Q 10/06; G06Q 10/107; G08B 21/0415; G08B 21/0469; G08B 21/22; G01S 19/48; G01S 5/0027; G01S 5/0263
USPC ............... 340/539.13, 573.1, 573.4, 529, 8.1, 340/686.1, 541, 693.12, 517, 531; 382/103; 455/456.1, 457, 414.2, 433, 435.1, 455/404.2; 709/224
See application file for complete search history.

(56) References Cited

U.S. PATENT DOCUMENTS

| | | |
|---|---|---|
| 7,058,358 B2 | 6/2006 | Cannon |
| 7,154,399 B2 | 12/2006 | Cuddihy |

(Continued)

OTHER PUBLICATIONS 18 year old self-taught electronics "genius" invents mobile phone-based vehicle anti-theft system, AfriGadget, Jul. 16, 2008, <http://fwww.afrigadget.com/2008/07f16/18-year-old-self-taught-electronics-genius-invents-mobile-phone-based-vehicle-anti-theft-system/>.

(Continued)

*Primary Examiner* — Mirza Alam
(74) *Attorney, Agent, or Firm* — Hartman & Citrin LLC

(57) ABSTRACT

Devices, systems, and methods are disclosed which aggregate presence detections, and use the diversity of presence detections to resolve presence ambiguities and increase the correctness of information. Presence confidence levels and reliability values increase the effectiveness of services based on presence. A variety of methods enable presence detection and reporting. Each of these methods has advantages and disadvantages. The limitations of each of the individual methods are overcome with exemplary embodiments of the subject disclosure.

20 Claims, 9 Drawing Sheets

(51) Int. Cl.
*H04L 29/08* (2006.01)
*G06N 5/02* (2006.01)

(56) References Cited

U.S. PATENT DOCUMENTS

| | | | |
|---|---|---|---|
| 7,243,149 B2 | 7/2007 | Kelley | |
| 2005/0237206 A1* | 10/2005 | Cuddihy | G08B 21/028 340/573.1 |
| 2007/0078968 A1* | 4/2007 | Kelley | H04L 67/24 709/224 |
| 2008/0320550 A1 | 12/2008 | Strassner et al. | |
| 2009/0058638 A1 | 3/2009 | Kanagala | |
| 2010/0008540 A1 | 1/2010 | Shet et al. | |
| 2010/0099410 A1 | 4/2010 | Sweeney | |
| 2010/0250727 A1* | 9/2010 | King | G01S 5/0027 709/224 |
| 2010/0262809 A1* | 10/2010 | McColgan | G06N 5/025 712/216 |
| 2011/0084832 A1* | 4/2011 | Midtun | G06Q 10/06 340/539.13 |

OTHER PUBLICATIONS

U.S. Office Action dated Jul. 10, 2014 in U.S. Appl. No. 13/034,554.
U.S. Notice of Allowance dated Jan. 9, 2015 in U.S. Appl. No. 13/034,554.

* cited by examiner

DEVICES, SYSTEMS, AND METHODS FOR PRESENCE DETERMINATION

CROSS REFERENCE TO RELATED APPLICATION

This application is a continuation of U.S. application Ser. No. 13/034,554, filed Feb. 24, 2011, now U.S. Pat. No. 9,094,786, the entirety of which is herein incorporated by reference.

BACKGROUND OF THE SUBJECT DISCLOSURE

1. Field of the Subject Disclosure

The subject disclosure relates to user presence in communications networks. More specifically the subject disclosure relates to determining presence based on an aggregation of presence detections.

2. Background of the Subject Disclosure

Mobile devices, such as cellular telephones, have become a common tool of everyday life. Cellular telephones are no longer used simply to place telephone calls. With the number of available features rapidly increasing, cellular telephones are now used for storing addresses, keeping a calendar, reading e-mails, drafting documents, etc. These devices are small enough that they can be carried in a pocket or purse all day, allowing a user to stay in contact almost anywhere. Recent devices have become highly functional, providing applications useful to business professionals as well as the casual user.

Carrying a mobile device everywhere brings with it an expectation that the user is in constant contact at all times. However, this is not always desirable. Further, a user may carry or use multiple devices such as a cellular phone, a plain old telephone (POT), or a computer. The concept of "presence" is therefore introduced as a means for a user to indicate their availability or lack thereof to other users. A presence could include a status of the user such as "available", "busy", or "away from desk", and so on.

Presence information can further be used to provide users with a variety of services. For example, in a Find-Me-Follow-Me service, a user can be reached for a voice call with his mobile telephone, office telephone, and home telephone from a single number. Early adaptations of this service simply called the user's devices in succession until the user was reached. The user could set a schedule to determine which device to call first. With presence detection, the service knows which device to call, but the presence is detected through an activation or confirmation made by the user. For instance, when the user leaves the office, the user executes a program on the mobile telephone to confirm to the service that the user is now using the mobile telephone.

A variety of methods can enable presence detection and reporting. However, no single method alone may provide the desired presence information correctness for enabling a broad based commercial offering.

SUMMARY OF THE SUBJECT DISCLOSURE

The subject disclosure supports multiple methods, aggregates data, and uses the diversity of data to resolve presence ambiguities and increase the accuracy of presence information. Presence confidence levels and reliability values are introduced to increase the effectiveness of services based on presence.

Presence information can be used to provide enriched user service experiences. For example, if a user leaves home without locking the front door, exemplary embodiments of the subject disclosure detect the user is not at home, detect that the front door is unlocked, push a security alert to the user's telephone, and enable the user to remotely lock their front door.

In one exemplary embodiment, the subject disclosure is a system for determining a presence of a user. The system includes at least one server, an analysis logic on one of the at least one server, the analysis logic for receiving a plurality of presence detections from a plurality of presence detectors, determining a presence by resolving conflicting presence detections, and transmitting the presence determination to the presence logic, and a presence logic on one of the at least one server, the presence logic for receiving the presence determination from the analysis logic, receiving a request for the presence determination from an application server, and transmitting the presence determination to the application server. The presence determination indicates that a user has a position that is one of at a location and not at the location.

In another exemplary embodiment, the subject disclosure is a system for determining a presence of a user. The system includes at least one server, an analysis logic on one of the at least one server for receiving a plurality of presence detections from a plurality of presence detectors, the plurality of presence detectors including a service gateway at a location, determining a presence by resolving conflicting presence detections, and transmitting the presence determination to the presence logic, and a presence logic on one of the at least one server for receiving the presence determination from the analysis logic, receiving a request for the presence determination from an application server, and sending the presence determination to the application server. The presence determination indicates that a user has a position that is one of at the location and not at the location.

In yet another exemplary embodiment, the subject disclosure is a method for determining presence. The method includes receiving a plurality of presence detections, and determining a presence by resolving conflicting presence detections. The presence determination indicates that a user has a position that is one of at a location and not at the location.

DETAILED DESCRIPTION OF THE INVENTION

Figure 1:
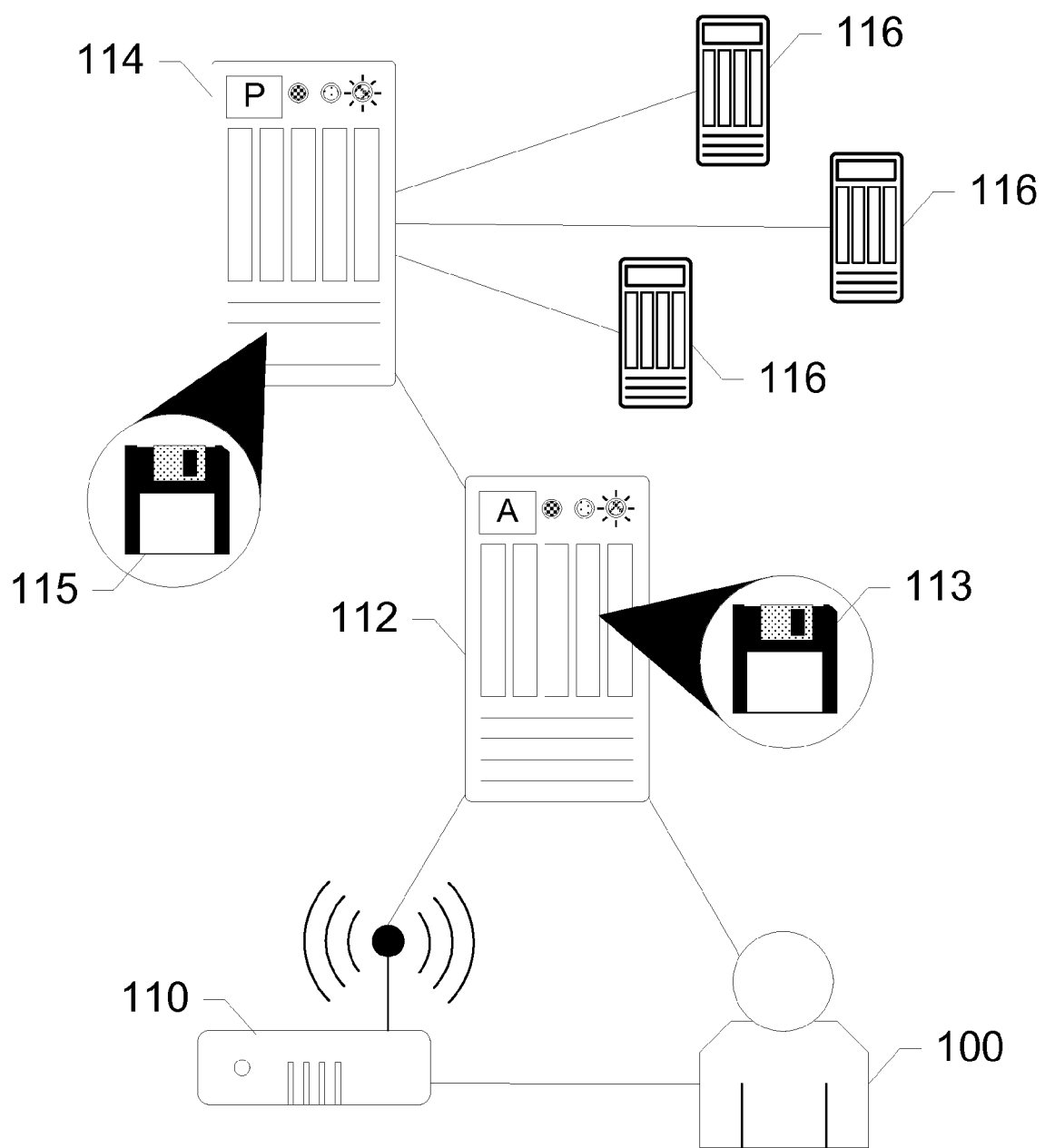
FIG. 1 shows a system for determining presence, according to an exemplary embodiment of the subject disclosure.

The subject disclosure supports multiple systems and methods, aggregates presence detections, and uses the diversity of presence detections to resolve presence ambiguities and increase the accuracy of presence information. Presence confidence levels and reliability values increase the effectiveness of services based on presence.

Exemplary embodiments of the subject disclosure enable the deployment of improved, more accurate, and user satisfying commercial presence-based service offerings to wider target markets.

In exemplary embodiments of the subject disclosure, an analysis server is implemented on a network. The analysis server aggregates presence detections from a variety of sources, and applies analysis logic to the presence detections to derive a more accurate assessment of the user's presence status. Each presence detection is associated with a confidence level. Additionally, a reliability value is associated with the presence status, and taken into consideration when providing service offerings.

A presence server in the network supports an interface with messaging, enabling application servers to subscribe to updates regarding changes in a users' presence information. The presence server receives inputs informing it when the users' presence information changes. The presence server notifies a subscribed application server when watched users' presence information changes. A watched user is a user whose presence information is being monitored by an application or another service. For instance, application servers are presence watchers, and subscribe to the user's presence status information. When it's determined that a user is 'At Home', or 'Not At Home', a message is sent from the analysis server to the presence server informing the presence server of the user's status. When the user's status changes, the presence server notifies the application servers of the change in the user's status.

In an exemplary embodiment, the application server initially subscribes to the user's presence status through the presence server by using a SIP SUBSCRIBE message. A service gateway detects and reports the user's presence status based on detection of a radio signal, such as ZIGBEE, Z-WAVE, BLUETOOTH, etc., from a key fob carried by the user. When the user arrives at home, the key fob's radio signal is detected by the service gateway. The service gateway transmits a SIP PUBLISH message to the analysis server indicating that the user's presence status is 'At Home'. When the User leaves home, the radio signal from the user's key fob is no longer detected by the service gateway, and the service gateway transmits a SIP PUBLISH message to the analysis server indicating the user status is 'Not At Home'. The analysis server considers the detection of the key fob to detect the user's presence, and transmits the presence detection to the presence server via a SIP PUBLISH message. The presence server transmits a SIP NOTIFY message to the application server when the user's presence information changes, indicating the user's current presence status. The application server checks the user's rules, and if appropriate, transmits an alert to the user. For example, if the user is 'Not At Home' and a door is 'Unlocked', then the application server transmits a security alert to the user. The security alert includes a message that the door is left unlocked, and may further provide an option to remotely lock the door.

"Wireless communication device", as used herein and throughout this disclosure, refers to any electronic device capable of wirelessly sending and receiving data. A wireless communication device may have a processor, a memory, a transceiver, an input, and an output. Examples of such devices include cellular telephones, personal digital assistants (PDAs), portable computers, etc. The memory stores applications, software, or logic. Examples of processors are computer processors (processing units), microprocessors, digital signal processors, controllers and microcontrollers, etc. Examples of device memories that may comprise logic include RAM (random access memory), flash memories, ROMS (read-only memories), EPROMS (erasable programmable read-only memories), and EEPROMS (electrically erasable programmable read-only memories).

"Logic", as used herein and throughout this disclosure, refers to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a telecommunication network, logic may be programmed on a server, or a complex of servers. A particular logic unit is not limited to a single logical location on the telecommunication network.

Wireless communication devices communicate with each other and with other elements via a network, for instance, a wireless network, or a wireline network. A "network" can include broadband wide-area networks such as cellular networks, local-area networks (LAN), and personal area networks, such as near-field communication (NFC) networks including BLUETOOTH® Communication across a network is preferably packet-based; however, radio and frequency/amplitude modulations networks can enable communication between wireless communication devices using appropriate analog-digital-analog converters and other elements. Communication is enabled by hardware elements called "transceivers." Wireless communication devices may have more than one transceiver, capable of communicating over different networks. For example, a cellular telephone can include a cellular transceiver for communicating with a cellular base station, a Wi-Fi transceiver for communicating with a Wi-Fi network, and a BLUETOOTH® transceiver for communicating with a BLUETOOTH® device. A network typically includes a plurality of elements, such as servers, that host logic for performing tasks on the network.

A "presence detection", as used herein and throughout this disclosure, refers to the detection of a user through a single method. Examples of a presence detection include a service gateway detecting a key fob carried by a user, a GPS location indicating a user's position, a cellular telephone reporting a Cell ID of the current macrocell, etc. Exemplary embodiments of the subject disclosure assign a confidence level to a presence detection, as is further described herein. A "presence detector", as used herein and throughout this disclosure, refers to a device involved in a presence detection. Examples of presence detectors include a wireless communication device, a key fob, a service gateway, an HLR, a macrocell, a femtocell, etc. Multiple presence detectors may contribute to a single presence detection, and one presence detector may be capable of performing multiple presence detections. A "presence determination", as used herein and throughout this disclosure, refers to the result of an aggregation of a plurality of presence detections applied to logic. Exemplary embodiments of the subject disclosure associate a reliability value with presence determinations.

For the following description, it can be assumed that most correspondingly labeled structures across the figures (e.g., 110 and 310, etc.) possess the same characteristics and are subject to the same structure and function. If there is a difference between correspondingly labeled elements that is not pointed out, and this difference results in a non-corresponding structure or function of an element for a particular embodiment, then that conflicting description given for that particular embodiment shall govern.

FIG. 1 shows a system for determining presence, according to an exemplary embodiment of the subject disclosure. The system includes a user 100, a service gateway 110, an analysis server 112 including analysis logic 113, a presence server 114 including presence logic 115, and a plurality of application servers 116. A presence of user 100 is detected through various presence detectors. Each of the presence detectors sends presence detections to either service gateway 110 or analysis server 112. Presence detections received by service gateway 110 are forwarded to analysis server 112. Analysis server 112 aggregates the presence detections, resolves presence ambiguities, and determines a presence status for the user. Once analysis server 112 has determined a presence status, the presence status is sent to presence server 114. Presence server 114 references application servers 116 which have subscribed to user 100's presence status, and transmits the current presence status to each subscribed application server 116. Application servers 116 make use of the presence information in a variety of ways.

It is advantageous for analysis server 112 to transmit the presence status message to presence server 114 first, instead of transmitting the message directly to the application servers 116. This makes the presence information generically available to a diversity of application servers in communication with the presence server, and not just a single application server. Presence information in presence server 114 is exposed, for example, via an API or SDK to 3rd Party Developers, making it available for a variety of application servers. However, in other embodiments, the analysis server may transmit the presence status directly to the application servers.

Figure 2:
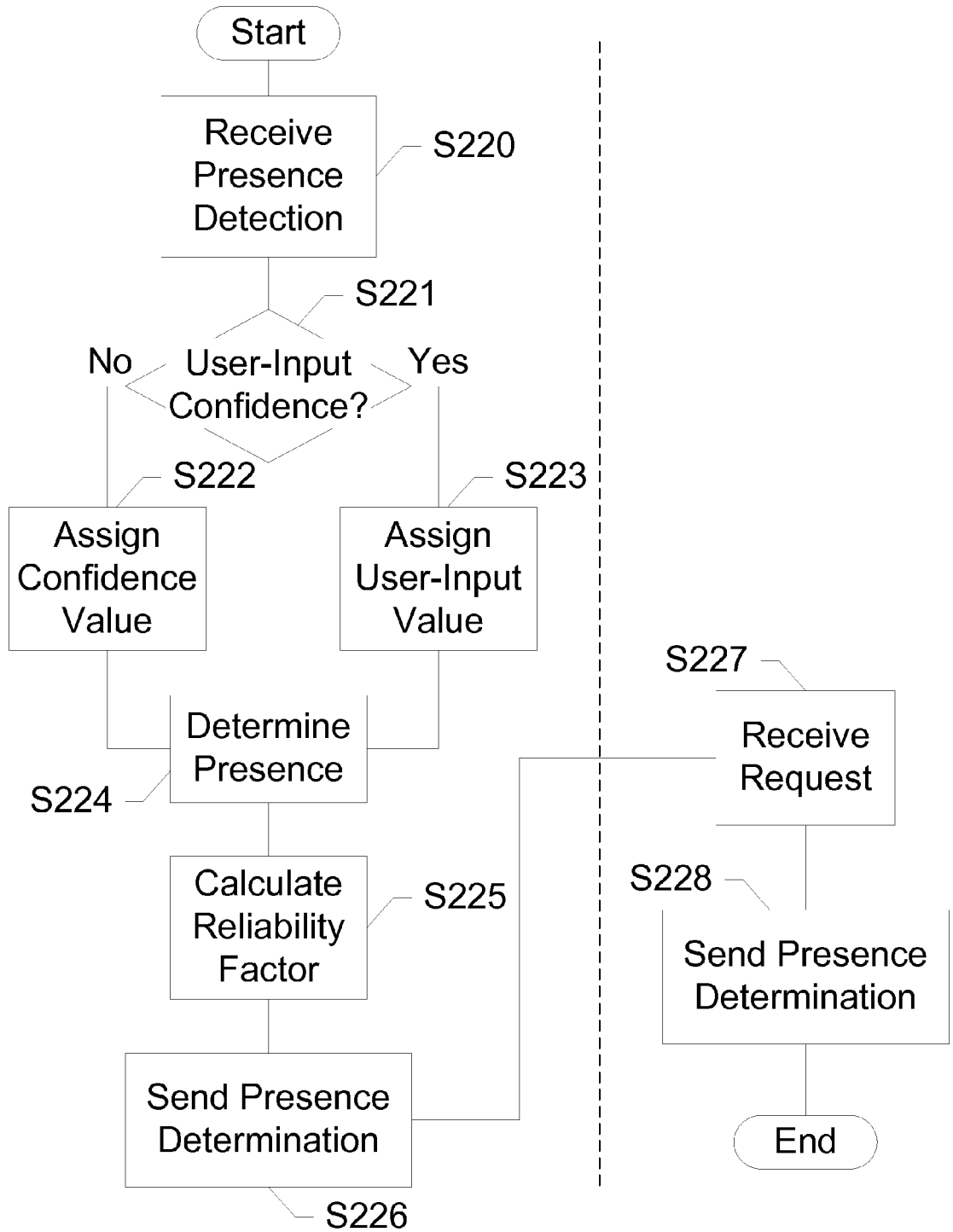
FIG. 2 shows a method for determining presence, according to an exemplary embodiment of the subject disclosure.

FIG. 2 shows a method for determining presence, according to an exemplary embodiment of the subject disclosure. The method is carried out between the analysis server and the presence server, and the steps have been divided by the dotted line. Steps on the left side are carried out by the analysis server while steps on the right are carried out by the presence server. The method begins when the analysis server receives a presence detection of the user S220. The analysis server determines whether or not the user has input a confidence level to this particular detection S221. If the user has not input a confidence level, then the analysis server assigns a confidence level S222. The assigned confidence level is a calculation based on past detections. However, if the user has input a confidence level, then the analysis server uses the user-input confidence level S223. The analysis server then aggregates this detection with other detections to determine a presence status S224. The aggregation step includes sorting between conflicting presence detections, totaling the confidence levels of alike presence detections, and ranking the presence detections based on total confidence level. One or more of the highest ranking presence detections are used to determine the presence status. Once the presence status is determined, a reliability value is calculated using the confidence levels of the presence detections S225. The presence status determination is sent to the presence server along with the reliability value S226. At the presence server, a request is received for the user's presence status from an application server S227. The presence server transmits the presence status of the user to the application server S228.

The confidence level is used to resolve the uncertainty of the user's presence when a conflict exists by providing greater weight to presence detections associated with higher confidence levels. The confidence level is a relative metric associated with the accuracy of a presence detection. The confidence levels are used to provide a reliability value as an indicator of the probability of accurate presence status. The confidence level is derived from historical data, with or without user confirmation, for the various presence detections. Further, the reliability value of the presence status is based on the comparative confidence levels of the presence detections. For example, if three presence detections report that the user is 'At Home', then the analysis logic may provide a very high reliability value. However if the three presence detections are not in agreement, then the reliability value may be substantially lower, depending on the weighted confidence levels.

In this embodiment, the analysis logic is on the analysis server. However, in other embodiments, the analysis logic is implemented in the presence server. When the analysis logic is on the analysis server, the analysis server needs to support an interface that receives incoming presence detections, and an interface providing the user's presence status to the presence server. The reliability value is communicated from the analysis server to the presence server when the user's presence status changes as a parameter in the message used to provide the presence information to the presence server.

In further embodiments, additional logic is applied by the analysis server to further resolve data discrepancies between presence detections and to refine the reliability value. For example, if the analysis server receives presence detections indicating that a user's GPS coordinates are essentially the same as another related user's coordinates who is also indicated to be 'Not At Home', the analysis server will conclude they are together, therefore even more likely to be 'Not At Home', and increase the reliability value accordingly. In other embodiments, the analysis server also considers additional analytic information such as a pattern recognition that these two users usually go out together on Friday night, that tonight is Friday night, and that the reliability value should be even further increased.

In further embodiments, the values for the user's presence determination include a variety of values besides 'At Home' or 'Not At Home'. These values enable more meaningful and enriched delivery of location-based services. Presence determinations include 'At Work', 'At Church', 'On Vacation', 'Do Not Disturb', etc. The values are provided as a default or manually input by the user. A system that supports other values besides 'At Home' may still support 'Not At Home' for cases where the user isn't at home, with none of the other presence determinations being applicable. For example, while the user is commuting from home to work and isn't at either location, a presence determination of 'Not At Home' is useful.

With the addition of multiple values for presence determinations, the resolution of conflicting values, depending on the presence detector, becomes even more important. The approach described herein for aggregation and analysis provides meaningful and accurate presence-based services with minimal 'false' or undesired user experiences. Further, the addition of a reliability value allows for services that are implemented to enable the user to specify a service behavior if the reliability is below or above a threshold value. In some embodiments, to avoid potential 'false' alerts, a rule is established to only alert the user if the reliability level is above 75% and meets other conditions.

Certain embodiments consider additional presence detections for assessing the correctness of the presence status. If the user's calendar indicates the user is expected to be 'Not At Home', such as on a business trip, at a restaurant, etc., and there is a conflict in the presence detections such that some detections indicate the user is 'At Home' and some detections 'Not At Home', then more credibility may be given to the detections that agree with the calendar information. The basic problem with calendar information as a presence detector is that a lot of users do not maintain accurate calendar information. In general, automatic methods have a higher probability of providing accurate information than a manual method.

In other embodiments, a user's manually input location information, indicating if they are 'At Home' or 'Not At Home', is considered by the analysis logic in resolving conflicting presence detections.

In further embodiments, timestamps are considered by the analysis logic in resolving conflicting presence detections, assuming that the more recent presence detections are more accurate than older presence detections. More recent presence detections are assigned a higher confidence level. User options include raising the confidence level of a user-input confidence level when it is more recent.

A variety of presence detectors are possible and considered to contribute toward the aggregation of detections. These presence detectors may either communicate directly with the analysis server, or indirectly through a service gateway, macrocell, or HLR. In some embodiments, the analysis server is located at the home or other location of interest, and contains all the functionality of the service gateway, thus negating the need for the service gateway. The following presence detectors are shown communicating with both the service gateway and the analysis server to demonstrate both embodiments.

Figure 3:
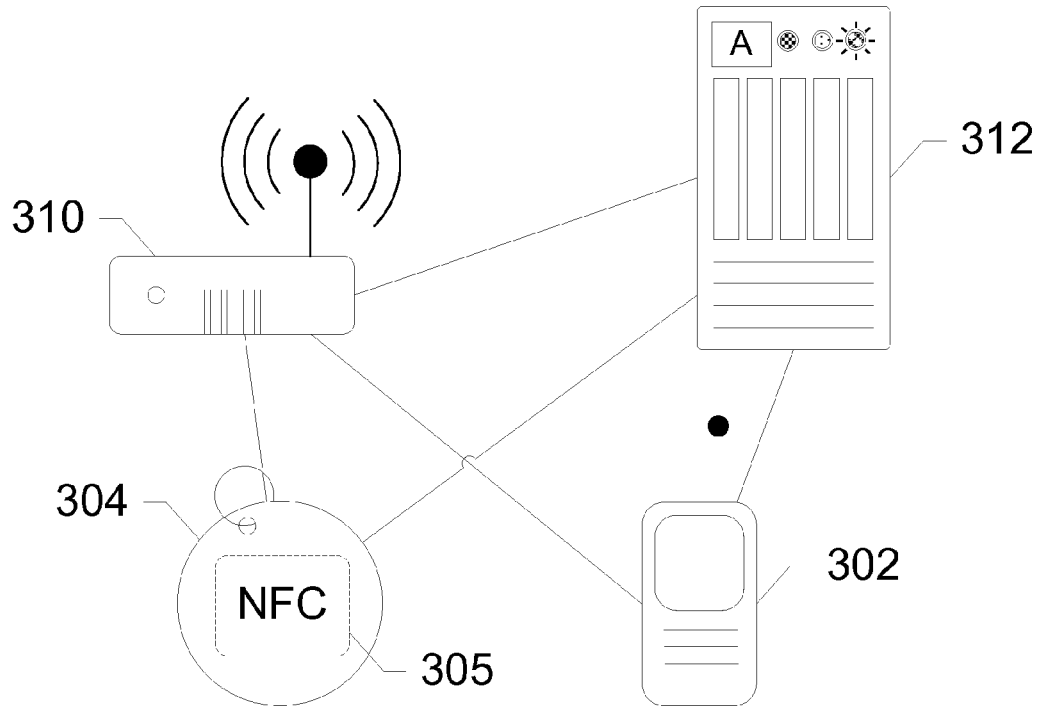
FIG. 3 shows a system for detecting presence using near-field communication, according to an exemplary embodiment of the subject disclosure.

FIG. 3 shows a system for detecting presence using near-field communication, according to an exemplary embodiment of the subject disclosure. The system includes a wireless communication device 302, a near-field communication (NFC) key fob 304 including an NFC transceiver 305 and other NFC circuitry (not shown), a service gateway 310, and an analysis server 312. Service gateway 310 communicates with key fob 304 and wireless communication device 302 using NFC communication. The NFC communication may be ZIGBEE, Z-WAVE, BLUETOOTH, etc. When the user is at home, service gateway 310 is in communication with key fob 304 and wireless communication device 302, and detects the user's presence as 'At Home'. When the user is not at home, service gateway 310 is out of the range of communication with key fob 304 and wireless communication device 302, and detects the user's presence as 'Not At Home'. Service gateway 310 transmits this presence detection to analysis server 312 each time the presence detection changes. Service gateway 310 is able to detect the presence because service gateway is physically located at the home of the user. In embodiments where analysis server 312 is physically located at the home of the user, analysis server 312 detects the presence through NFC communication with key fob 304 and wireless communication device 302.

This presence detection has the advantage of simplicity. However, in some scenarios, there may be more than one user living in a home, and the desired service behavior depends on whether or not any of the users are at home. If one of the users leaves their key fob at home while away, the service gateway may erroneously detect a user at home. For example, if a husband and wife go out to dinner, the husband may drive, taking his key fob, and the wife leaves her key fob at home. To mitigate this problem, logic is implemented in the analysis server to designate one of the key fobs as a primary key fob, and the others as secondary key fobs. If a data conflict exists between the primary and secondary key fobs, then the data associated with the primary key fob is used. If the husband usually drives when they go out, his key fob is designated as the primary key fob.

Detection of a low range radio interface on the user's wireless communication device by the service gateway has some advantages over detection of a key fob. Wi-Fi, another type of NFC, as a radio interface may not be suitable for a key fob-based method due to the energy requirements of Wi-Fi. However, many wireless communication devices, such as cellular telephones with their larger batteries, currently support Wi-Fi radio interfaces, which make this viable. Users who already have wireless communication devices would not need to carry an additional device with them explicitly for the purpose of home presence detection. The probability that a user will leave home without their wireless communication device is less than the probability that a user will leave home without their key fob.

In other exemplary embodiments, this presence detection is implemented for cellular telephones without Wi-Fi. Additional functionality is supported in the service gateway to detect the cellular telephone radio and report presence detection to the analysis server.

Figure 4:
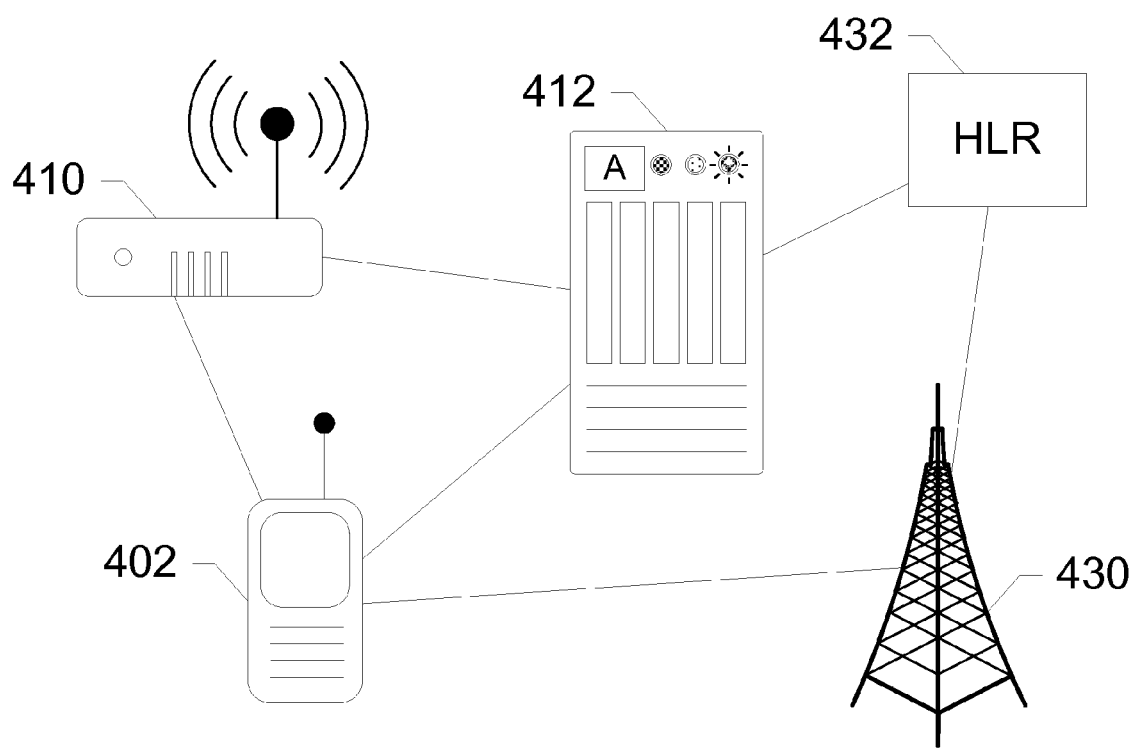
FIG. 4 shows a system for detecting presence using a femtocell, according to an exemplary embodiment of the subject disclosure.

FIG. 4 shows a system for detecting presence using a femtocell, according to an exemplary embodiment of the subject disclosure. The system includes a cellular telephone 402, a service gateway 410 including a femtocell, an analysis server 412, a macrocell 430, and a home location register (HLR) 432. Macrocell 430 is any base station, radio tower, or similar element that is part of a broader cellular network. Service gateway 410 uses a femtocell to detect and report when cellular telephone 402 is present via a cellular radio interface, such as GSM, EDGE, LTE, etc. Service gateway 410 transmits a presence detection of 'At Home' when the femtocell detects cellular telephone 402. However, service gateway 410 is unable to detect when the cellular telephone 402 is out of range of the femtocell, and at the same time within range of and in communication with macrocell 430. When cellular telephone 402 is in communication with macrocell 430, HLR 432 reports the Cell ID of macrocell 430 to analysis server 412.

If the Cell ID received at analysis server 412 is the femtocell ID, then the user is at home. If the Cell ID is not the femtocell ID, or is any macrocell ID, then the user is not at home. In some networks, femtocell IDs may not be unique. In these networks, a low risk exists that a user's cellular telephone will be granted access to another femtocell that has the same Cell ID as his home femtocell. For these networks, a lower confidence level is assigned to femtocell presence detection.

Figure 5:
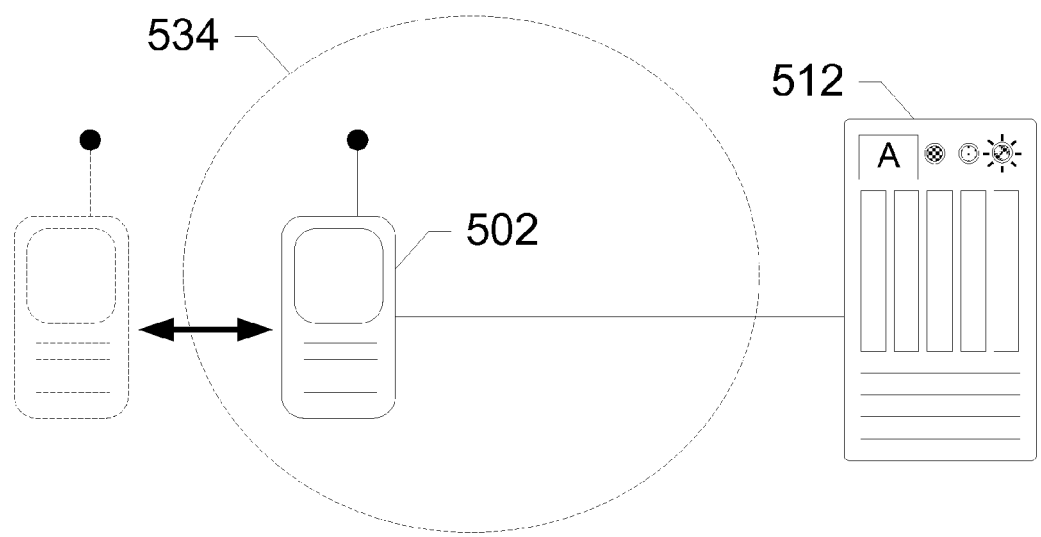
FIG. 5 shows a system for detecting presence using GPS, according to an exemplary embodiment of the subject disclosure.

FIG. 5 shows a system for detecting presence using GPS, according to an exemplary embodiment of the subject disclosure. The system includes a wireless communication device 502 including a GPS transceiver, a geofence 534, and an analysis server 512. Geofence 534 is a defined set of GPS coordinates indicating the bounds of a user's home. Wireless communication device 502 detects the GPS coordinates, and determines whether or not they are within geofence 534. If the GPS coordinates are within geofence 534, then the user's presence detection is 'At Home'. If the GPS coordinates are outside geofence 534, then the user's presence detection is 'Not At Home'.

In some embodiments, the geofence coordinates are determined by having the user initialize the GPS to set the geofence coordinates when the user is at home. The user simply presses a button on the wireless communication device, and the 'At Home' geofence coordinates are determined and stored. Whenever the user is within the geofence they are 'At Home'. In some embodiments, the geofence is a single coordinate and a radius, while in other embodiments the user sets multiple points to define the geofence.

In other embodiments, the wireless communication device provides GPS coordinates to the service gateway or analysis server to detect if the user is 'At Home' or 'Not At Home' before notifying the presence server of the status of the user.

Figure 6:
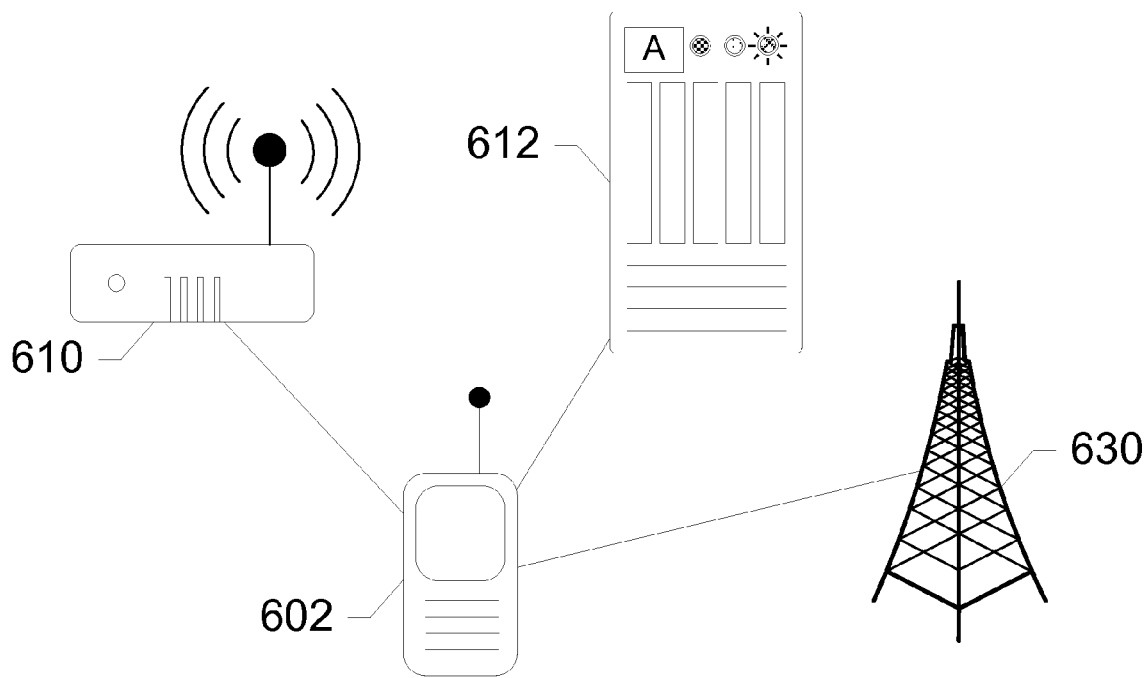
FIG. 6 shows a system for detecting presence using Cell ID, according to an exemplary embodiment of the subject disclosure.

FIG. 6 shows a system for detecting presence using Cell ID, according to an exemplary embodiment of the subject disclosure. The system includes a wireless communication device 602, a service gateway 610 including a femtocell, an analysis server 612, and a macrocell 630. Wireless communication device 602 detects presence based on whether or not it is in communication with the femtocell of service gateway 610. When the Cell ID changes to the Cell ID of the femtocell of service gateway 610, then wireless communication device 602 detects the user is 'At Home' and transmits the presence detection to analysis server 612. When the Cell ID changes to a different Cell ID, such as the Cell ID of macrocell 630, then wireless telecommunication device 602 detects that the user is 'Not At Home' and transmits the presence detection to analysis server 612.

This presence detection has the advantage of avoiding requiring the femtocell and service gateway to report the presence detection. It does, however, still have the problem of possibly reporting an erroneous presence detection if a user's cellular telephone attaches to another femtocell with the same Cell ID as the user's home femtocell. Some service providers provide unique femtocell IDs throughout their network.

Figure 7:
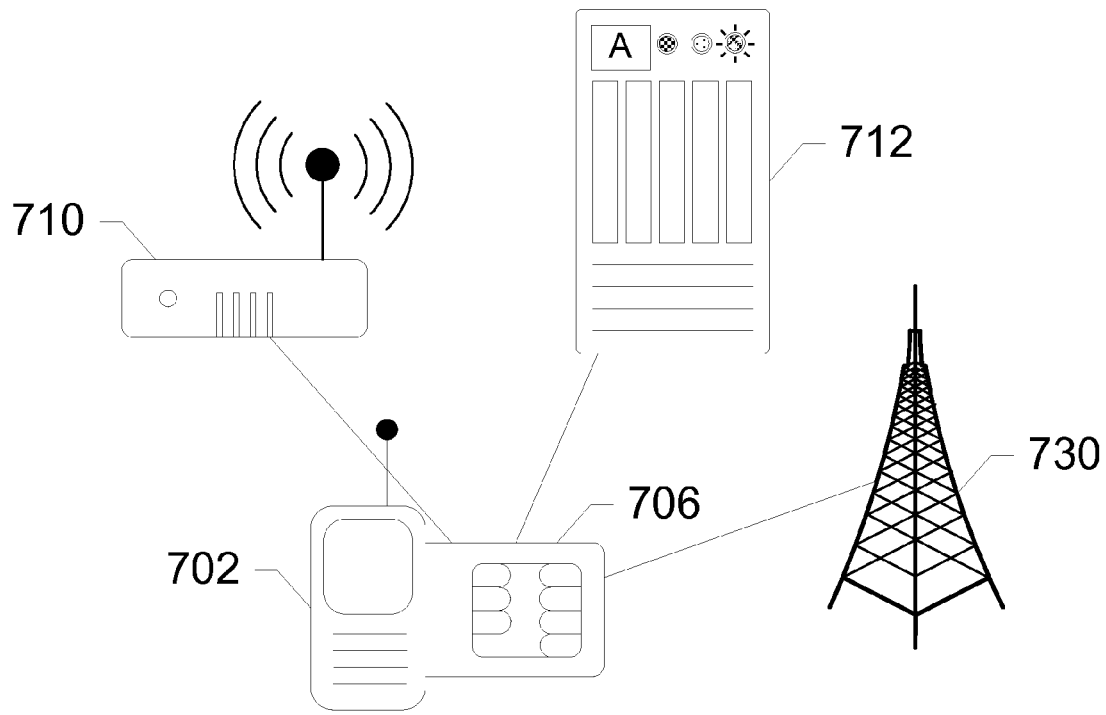
FIG. 7 shows a system for detecting presence using a SIM Card, according to an exemplary embodiment of the subject disclosure.

FIG. 7 shows a system for detecting presence using a (Subscriber Identity Module) SIM card, according to an exemplary embodiment of the subject disclosure. The system includes a cellular telephone 702 including a SIM card 706, a service gateway 710 including a femtocell, an analysis server 712, and a macrocell 730. SIM card 706 is a type of Universal Integrated Circuit Card (UICC), and is used in GSM mobile systems' cellular telephones. SIM card 706 has memory capacity to contain unique identifiers for the user, as well as several applications in addition to the security mechanism it provides. SIM card 706 supports presence detection and reporting based on femtocell detection.

When a user activates the femtocell of service gateway 710, the 'home' femtocell ID is sent to a SIM Tool Kit (STK) application on SIM card 706. The STK allows reporting of location, using commonly known values such as MCC, MNC, LAC, Cell ID/Extended Cell ID, to compare the received location information with the 'home' femtocell ID. If there is a match, then SIM Card 706 transmits a presence detection to analysis server 712 of 'At Home'. If there is not a match, then SIM Card 706 transmits a presence detection to analysis server 712 of 'Not At Home'.

In other embodiments, the STK also allows SIM Card 706 to request GPS information, which can be used to detect presence using a geofence.

Figure 8:
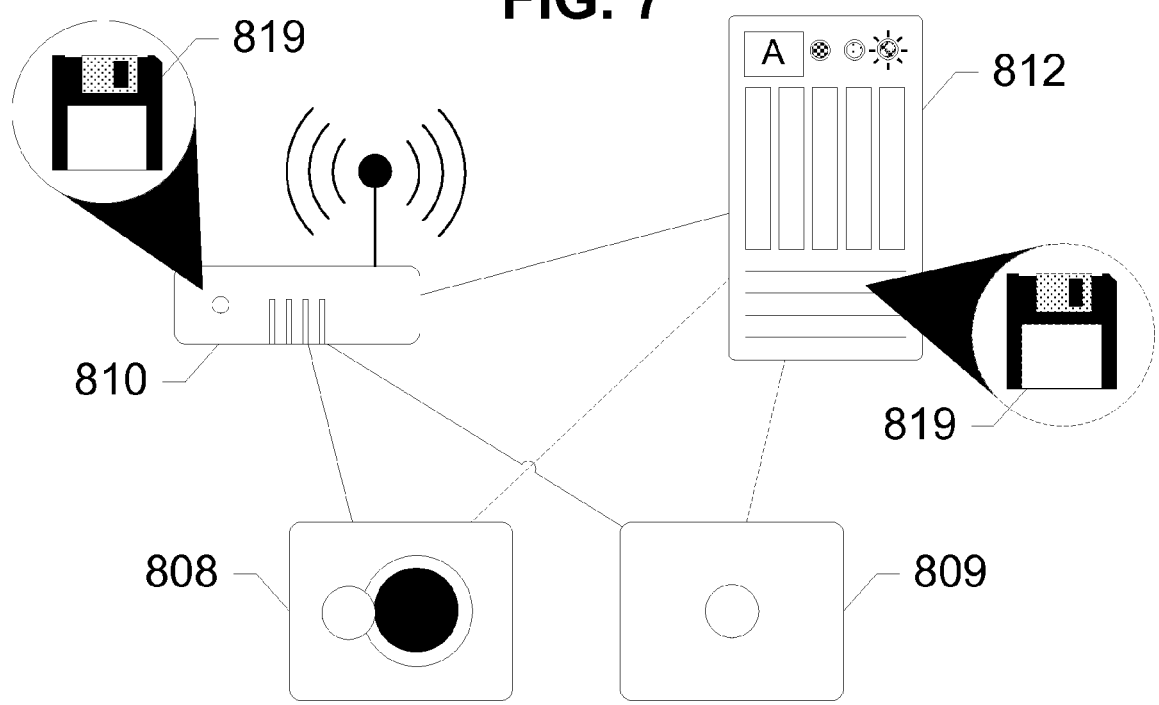
FIG. 8 shows a system for detecting presence using sensors, according to an exemplary embodiment of the subject disclosure.

FIG. 8 shows a system for detecting presence using security sensors, according to an exemplary embodiment of the subject disclosure. The system includes a camera 808, a motion sensor 809, a service gateway including sensor logic 819, and an analysis server 812 including sensor logic 819. Image recognition and biometric identification is taken into consideration by sensor logic 819 for further refinement of presence detection. Service gateway 810 uses sensor logic 819 to detect presence and send the presence detection to the analysis server. Camera 808 and motion sensor 809 can also be directly connected to analysis server 812. In these embodiments, analysis server 812 includes sensor logic 819.

In other embodiments, the sensor logic for detecting presence based on such sensors is provided in a home local area network (LAN) component such as a personal computer (PC), or in a dedicated module.

Figure 9:
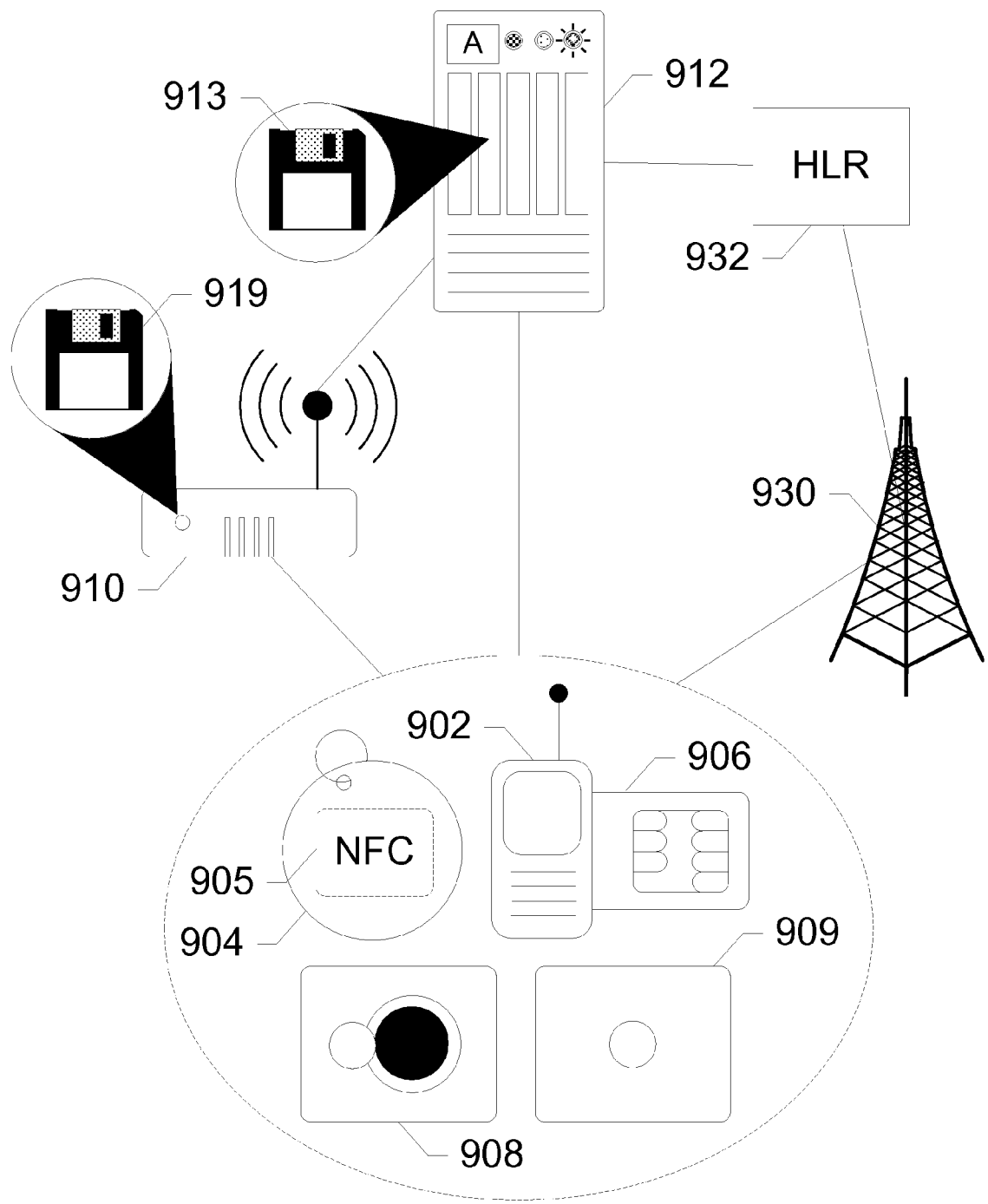
FIG. 9 shows a system for detecting presence using multiple detectors, according to an exemplary embodiment of the subject disclosure.

FIG. 9 shows a system for detecting presence using multiple detectors, according to an exemplary embodiment of the subject disclosure. The system includes a wireless communication device 902 including a SIM card 906, a key fob 904 including an NFC transceiver 905, a camera 908, a motion sensor 909, a service gateway 910 including sensor logic 919 and a femtocell, an analysis server 912 including analysis logic 913, a macrocell 930, and an HLR 932. This exemplary embodiment combines the above presence detecting methods and aggregates detections to resolve presence ambiguities. Each of presence detectors 902-909 communicates either directly with analysis server 912 or indirectly through service gateway 910 or macrocell 930 and HLR 932, depending on the type of presence detection and location of the detector. When wireless communication device 902 is 'At Home', the femtocell in service gateway 910 transmits the detection to analysis server 912. However, when wireless communication device is 'Not At Home', macrocell 930 detects wireless communication device 902, and forwards the presence detection to HLR 932, from where the presence detection is forwarded to analysis server 912. Once analysis server 912 receives all presence detections, analysis server 912 applies analysis logic 913 to make a presence determination as described above, including assigning a reliability value to the presence determination.

In embodiments where the analysis server is at the home or location of interest, the analysis server includes a femtocell and sensor logic, negating the need for a service gateway. However, these embodiments may require more bandwidth on site at the home or location of interest.

Figure 10:
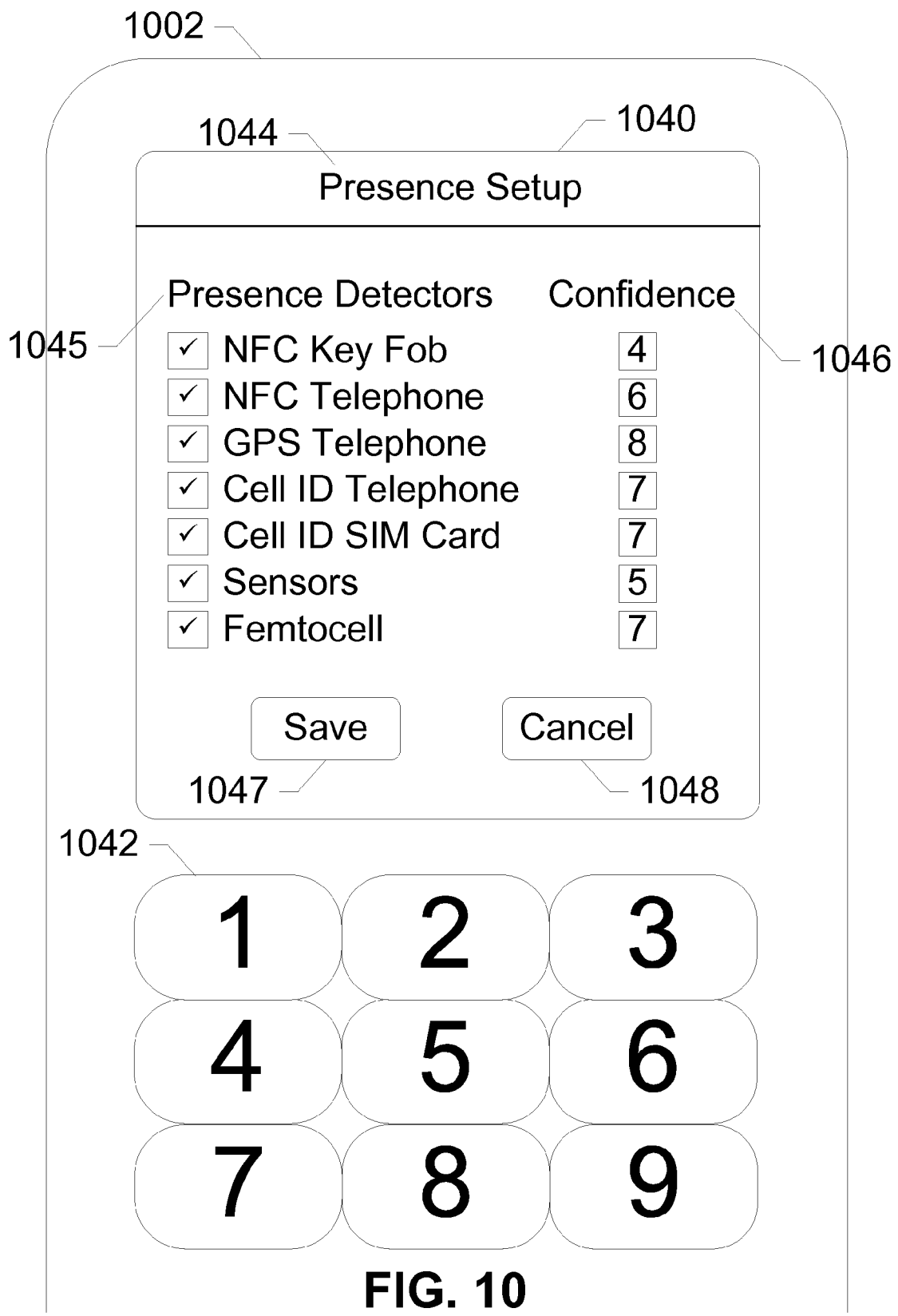
FIG. 10 shows a presence setup on a wireless communication device, according to an exemplary embodiment of the subject disclosure.

FIG. 10 shows a presence setup user interface 1044 on a wireless communication device 1002, according to an exemplary embodiment of the subject disclosure. Wireless communication device 1002 includes a display 1040 and a keypad 1042. Display 1040 is a liquid crystal display (LCD) which serves as a visual output for the user. Display 1040 is used to display presence setup user interface 1044. Keypad 1042 is an input for entering information and commands to wireless communication device 1002. Presence Setup 1040 is shown on display 1040, and includes a list of presence detectors 1045, a user-input confidence level 1046, a save button 1047, and a cancel button 1048. The user checks each presence detector 1045 in use, and unchecks each presence detector

1045 that is not in use. The user can then enter a user-input confidence level 1046 for each presence detector 1045. When the user is satisfied with selection of presence detectors 1045 and their respective confidence levels 1046, the user activates save button 1047, and the changes are saved to memory. If the user does not like the changes they have made to the selection of presence detectors 1045 or confidence levels 1046, then the user activates cancel button 1048, and the changes are discarded.

There are many embodiments of a wireless communication device that are capable of being equipped with the present subject disclosure. For instance, many legacy model cellular telephones are capable of executing the presence setup described above. In other embodiments of the wireless communication device, other displays are used, such as an LED display, OLED display, etc. In some embodiments, the display is used as a touch-sensitive input device, i.e. a touch screen. A touch screen allows the user to view output on the display as well as use the display to provide input. In some touch screen embodiments, the wireless communication device may not have a physical keypad for input. Instead, a virtual keypad is displayed on the touch screen and the user inputs by touching the virtual keys. Other forms of input such as full keyboards, accelerometers, motion sensors, etc., can be utilized in the wireless communication device. For older devices without advanced graphic interface capabilities, a voice-command system, DTMF tones, or combinations thereof may be used for presence setup.

Figure 11:
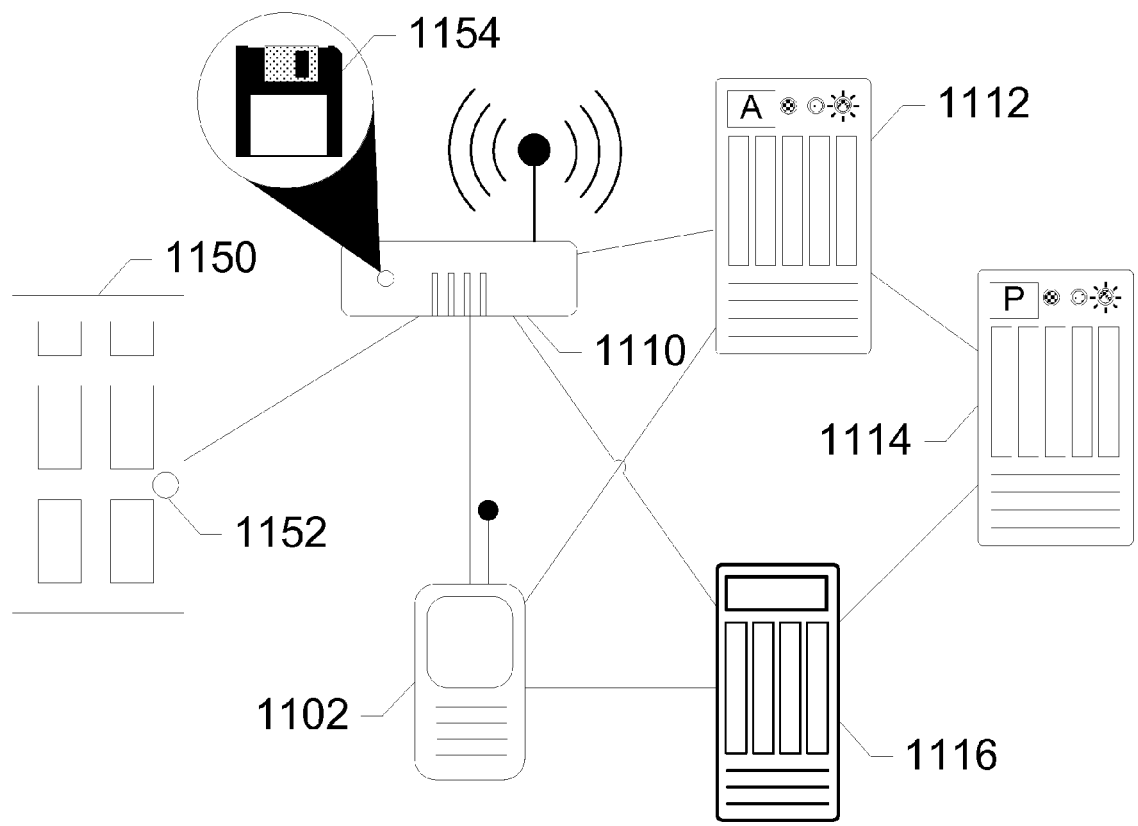
FIG. 11 shows a system for presence-based security alerts, according to an exemplary embodiment of the subject disclosure.

FIG. 11 shows a system for presence-based security alerts, according to an exemplary embodiment of the subject disclosure. The system includes a wireless communication device 1102, a service gateway 1110 including security logic 1154, an analysis server 1112, a presence server 1114, an application server 1116, and a front door 1150 including a lock 1152. The analysis server receives presence detections from wireless communication device 1102 and service gateway 1110. Analysis server 1112 transmits presence determinations to presence server 1114, which forwards the determinations to application server 1116. When application server 1116 receives a determination that no one is 'At Home', application server 1116 queries service gateway 1110 for the status of front door 1150. Service gateway 1110 checks the status of front door 1150 to determine whether lock 1152 is 'locked' or 'unlocked'. Service gateway 1110 transmits the status determination to application server 1116. When application server 1116 receives a presence determination that no one is 'At Home' and receives a status determination that front door 1150 is 'unlocked', application server 1116 transmits a security alert to wireless communication device 1102. Wireless communication device, upon input by the user, transmits a command to service gateway 1110 to lock front door 1150. Service gateway 1110 executes security logic 1154 which locks lock 1152 of front door 1150. Lock 1152 includes an actuator that is in communication with service gateway 1110, enabling lock 1152 to be locked and unlocked remotely.

Figure 12A:
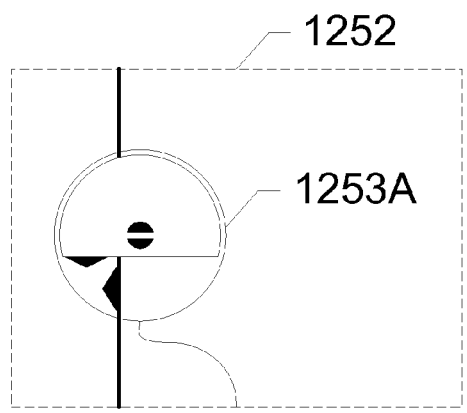
FIG. 12A shows a lock for a presence-based security system in a locked position, according to an exemplary embodiment of the subject disclosure.

FIG. 12A shows a lock 1252 for a presence-based security system in a locked position, according to an exemplary embodiment of the subject disclosure. Lock 1252 includes latch 1253A, which is in a 'locked' position. Upon receiving a signal from a service gateway, latch 1253A spins into an 'unlocked' position.

Figure 12B:
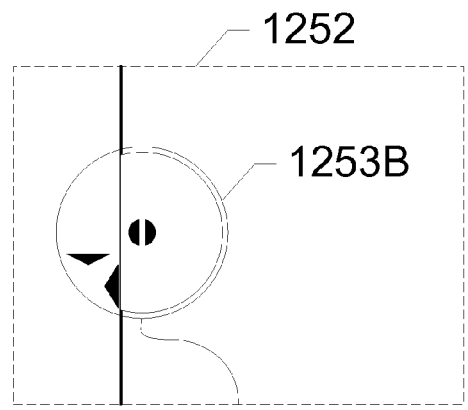
FIG. 12B shows a lock for a presence-based security system in an unlocked position, according to an exemplary embodiment of the subject disclosure.

FIG. 12B shows a lock 1252 for a presence-based security system in an unlocked position, according to an exemplary embodiment of the subject disclosure. Lock 1252 includes latch 1253B, which is in an 'unlocked' position. Upon receiving a signal from a service gateway, latch 1253B spins into a 'locked' position.

In addition to this security-related exemplary embodiment, a variety of similar presence-based service embodiments are possible. In other embodiments, an alert is transmitted if no one is at home and the house temperature falls below a specified temperature, for instance to prevent water pipes from freezing, etc. In further embodiments, an alert is transmitted if the outside temperature is a user-specified amount greater than the indoor temperature. In even further embodiments, an alert is transmitted if the doorbell rings. In parental embodiments, an alert is transmitted if the user's son has left home when he should be home.

Figure 13:
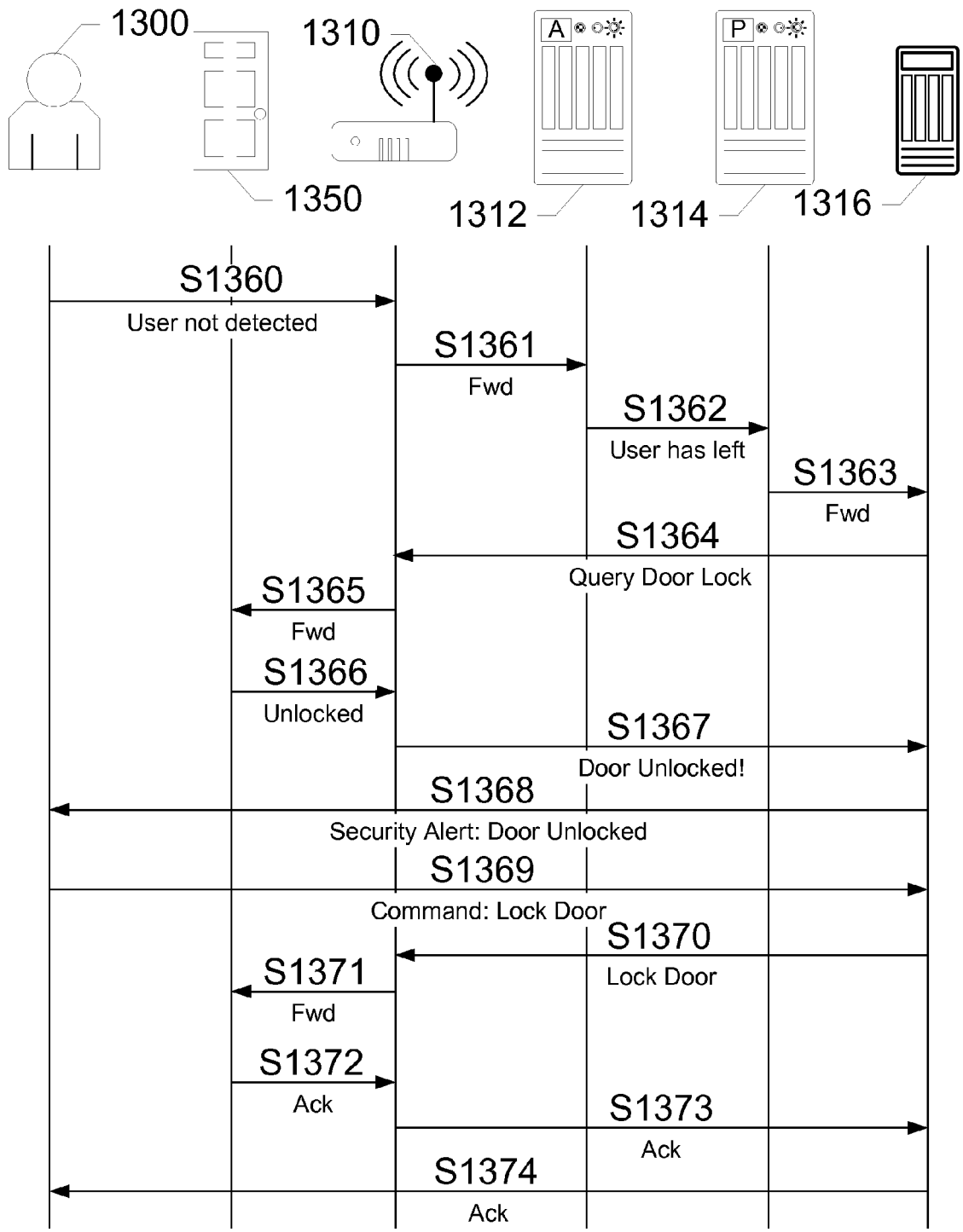
FIG. 13 shows a process flow diagram for presence-based security alerts, according to an exemplary embodiment of the subject disclosure.

FIG. 13 shows a process flow diagram for presence-based security alerts, according to an exemplary embodiment of the subject disclosure. The process involves user 1300 including a plurality of presence detectors, a front door 1350, a service gateway 1310, an analysis server 1312, a presence server 1314, and an application server 1316. Service gateway 1310 detects a presence from user 1300 (S1360). Analysis server 1312 receives presence detections of user 1300 through service gateway 1310 (S1361), and determines that the user is 'Not At Home'. Analysis server 1312 transmits this presence determination to presence server 1314 (S1362) which forwards the determination to application server 1316 (S1363). When application server 1316 receives a determination that user 1300 is 'Not At Home', application server 1316 queries service gateway 1310 for the status of front door 1350 (S1364). Service gateway 1310 checks the status of front door 1350 (S1365) and determines that front door 1350 is 'unlocked' (S1366). Service gateway 1310 transmits the status determination to application server 1316 (S1367). Application server 1312 receives the status determination that front door 1350 is 'unlocked', and transmits a security alert to user 1300 (S1368). User 1300 transmits a command to application server 1316 (S1369), which transmits the command to service gateway 1310 to lock front door 1350 (S1370). Service gateway 1310 locks front door 1350 (S1371). Service gateway then verifies that front door 1350 is 'locked' (S1372), and forwards the acknowledgement to application server 1316 (S1373). Finally, the acknowledgement is sent from application server 1316 to user 1300 (S1374).

In some embodiments, the system is implemented in a cellular network with IP capabilities, such as an IP Multimedia System (IMS). The communications in these embodiments include Session Initiation Protocol (SIP) messaging. SIP messaging includes SIP PUBLISH, SIP SUBSCRIBE, SIP NOTIFY, etc. Other embodiments user other communications systems.

The foregoing disclosure of the exemplary embodiments of the subject disclosure has been presented for purposes of illustration and description. It is not intended to be exhaustive or to limit the subject disclosure to the precise forms disclosed. Many variations and modifications of the embodiments described herein will be apparent to one of ordinary skill in the art in light of the above disclosure. The scope of the subject disclosure is to be defined only by the claims appended hereto, and by their equivalents.

Further, in describing representative embodiments of the subject disclosure, the specification may have presented the method and/or process of the subject disclosure as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the subject disclosure should not be limited to the performance of their steps in the order written, and one skilled in the art can readily appreciate that the sequences may be varied and still remain within the spirit and scope of the subject disclosure.

What is claimed is:

1. A server comprising:
   a processor; and
   a memory that stores instructions that, when executed by the processor, cause the processor to perform operations comprising
   receiving, from a plurality of presence detectors, a plurality of presence detections associated with a user,
   determining a confidence level associated with each of the plurality of presence detections,
   determining a conflict between the plurality of presence detections,
   resolving, based at least in part on the confidence level associated with each of the plurality of presence detections, the conflict to determine a presence status of the user, wherein the presence status of the user is based at least in part on a first presence detection of the plurality of presence detections comprising a cell identification of a femtocell received from a wireless communication device associated with the user,
   associating a reliability value with the presence status, wherein the reliability value is based on a comparison of the confidence level assigned to each of the plurality of presence detections, and
   transmitting the presence status of the user to an application for use in providing a service to the user based on the presence status, wherein a first behavior of the service is specified based on the reliability value associated with the presence status being above a threshold and a second behavior of the service is specified based on the reliability value associated with the presence status being below the threshold.

2. The server of claim 1, wherein the service comprises remotely locking, via a service gateway, a door of a home of the user when the presence status of the user indicates that the user is away from the home and when a status of the door of the home is determined to be unlocked.

3. The server of claim 1, wherein determining the confidence level associated with each of the plurality of presence detections comprises:
   determining, for the first presence detection of the plurality of presence detections, whether the user has input the confidence level associated with the first presence detection;
   in response to determining that the user has input the confidence level for the first presence detection, using the confidence level for the first presence detection to resolve the conflict; and
   in response to determining that the user has not input the confidence level for the first presence detection, assigning, based on past presence detections, the confidence level to the first presence detection.

4. The server of claim 1, wherein the plurality of presence detections is received from the plurality of presence detectors via a service gateway.

5. The server of claim 1, wherein the operations further comprise refining the reliability value associated with the presence status of the user based on a pattern recognition associated with the user.

6. The server of claim 1, wherein the operations further comprise refining the reliability value associated with the presence status of the user based on a presence status associated with another user related to the user.

7. The server of claim 1, wherein a first presence detector of the plurality of presence detectors is indicated as a primary presence detector and a second presence detector of the plurality of presence detectors is indicated as a secondary presence detector, and wherein a presence detection from the first presence detector is used over a presence detection from the second presence detector when the presence detection from the first presence detector conflicts with the presence detection from the second presence detector.

8. A method comprising:
   receiving, at a server comprising a processor, from a plurality of presence detectors, a plurality of presence detections associated with a user;
   determining, by the processor, a confidence level associated with each of the plurality of presence detections;
   determining, by the processor, a conflict between the plurality of presence detections;
   resolving, by the processor based at least in part on the confidence level associated with each of the plurality of presence detections, the conflict to determine a presence status of the user, wherein the presence status of the user is based at least in part on a first presence detection of the plurality of presence detections comprising a cell identification of a femtocell received from a wireless communication device associated with the user;
   associating, by the processor, a reliability value with the presence status, wherein the reliability value is based on a comparison of the confidence level assigned to each of the plurality of presence detections; and
   transmitting, by the processor, the presence status of the user to an application for use in providing a service to the user based on the presence status, wherein a first behavior of the service is specified based on the reliability value associated with the presence status being above a threshold and a second behavior of the service is specified based on the reliability value associated with the presence status being below the threshold.

9. The method of claim 8, wherein the service comprises remotely locking, via a service gateway, a door of a home of the user when the presence status of the user indicates that the user is away from the home and when a status of the door of the home is determined to be unlocked.

10. The method of claim 8, wherein determining the confidence level associated with each of the plurality of presence detections comprises:
    determining, for the first presence detection of the plurality of presence detections, whether the user has input the confidence level associated with the first presence detection;
    in response to determining that the user has input the confidence level for the first presence detection, using the confidence level for the first presence detection to resolve the conflict; and
    in response to determining that the user has not input the confidence level for the first presence detection, assigning, based on past presence detections, the confidence level to the first presence detection.

11. The method of claim 8, wherein the plurality of presence detections is received from the plurality of presence detectors via a service gateway.

12. The method of claim 8, further comprising refining the reliability value associated with the presence status of the user based on a pattern recognition associated with the user.

13. The method of claim 8, further comprising refining the reliability value associated with the presence status of the user based on a presence status associated with another user related to the user.

14. The method of claim 8, wherein a first presence detector of the plurality of presence detectors is indicated as a primary presence detector and a second presence detector of the plurality of presence detectors is indicated as a secondary presence detector, and wherein a presence detection from the first presence detector is used over a presence detection from the second presence detector when the presence detection from the first presence detector conflicts with the presence detection from the second presence detector.

15. A memory storing instructions that, when executed by a processor of a server, cause the processor to perform operations comprising:

receiving, from a plurality of presence detectors, a plurality of presence detections associated with a user;

determining a confidence level associated with each of the plurality of presence detections;

determining a conflict between the plurality of presence detections, resolving, based at least in part on the confidence level associated with each of the plurality of presence detections, the conflict to determine a presence status of the user, wherein the presence status of the user is based at least in part on a first presence detection of the plurality of presence detections comprising a cell identification of a femtocell received from a wireless communication device associated with the user;

associating a reliability value with the presence status, wherein the reliability value is based on a comparison of the confidence level assigned to each of the plurality of presence detections; and transmitting the presence status of the user to an application for use in providing a service to the user based on the presence status, wherein a first behavior of the service is specified based on the reliability value associated with the presence status being above a threshold and a second behavior of the service is specified based on the reliability value associated with the presence status being below the threshold.

16. The memory of claim 15, wherein the service comprises remotely locking, via a service gateway, a door of a home of the user when the presence status of the user indicates that the user is away from the home and when a status of the door of the home is determined to be unlocked.

17. The memory of claim 15, wherein determining the confidence level associated with each of the plurality of presence detections comprises:

determining, for the first presence detection of the plurality of presence detections, whether the user has input the confidence level associated with the first presence detection;

in response to determining that the user has input the confidence level for the first presence detection, using the confidence level for the first presence detection to resolve the conflict; and in response to determining that the user has not input the confidence level for the first presence detection, assigning, based on past presence detections, the confidence level to the first presence detection.

18. The memory of claim 15, wherein the plurality of presence detections is received from the plurality of presence detectors via a service gateway.

19. The memory of claim 15, wherein the operations further comprise refining the reliability value associated with the presence status of the user based on a pattern recognition associated with the user.

20. The memory of claim 15, wherein the operations further comprise refining the reliability value associated with the presence status of the user based on a presence status associated with another user related to the user.

* * * * *